United States Patent

Belgau

[15] 3,698,800
[45] Oct. 17, 1972

[54] VISUAL AND AUDIO PERCEPTION TESTING AND TRAINING APPARATUS

[72] Inventor: Frank A. Belgau, P.O. Box 936, La Porte, Tex. 77571

[22] Filed: Feb. 16, 1971

[21] Appl. No.: 115,548

[52] U.S. Cl. .................. 351/32, 46/175 R, 273/98, 351/2
[51] Int. Cl. .................. A61b 3/00, A61h 5/00
[58] Field of Search ....... 351/32, 37, 2; 46/175 R, 48, 46/49

[56] References Cited

UNITED STATES PATENTS

| | | | |
|---|---|---|---|
| 1,464,075 | 8/1923 | Hull | 351/2 X |
| 2,224,776 | 12/1940 | Bermann | 351/2 X |
| 3,535,819 | 10/1970 | Spilhaus | 46/175 R |

Primary Examiner—David Schonberg
Assistant Examiner—John W. Leonard
Attorney—Charles E. Lightfoot

[57] ABSTRACT

Visual and audio perception testing and training apparatus comprising a satellite or tracking member of hollow construction provided with sound producing means for use as a source of audio signals and also having visual target means for testing visual perception.

Means is provided for movably supporting the tracking member for movement along predetermined paths for visual observation and for testing the user's audio perception.

The apparatus may include visual and audio signal producing target means and missle means for use therewith to be used for testing audio and visual perception or for amusement purposes.

4 Claims, 4 Drawing Figures

PATENTED OCT 17 1972

Frank A. Belgau
INVENTOR

BY
Charles E. Lightfoot
ATTORNEY

VISUAL AND AUDIO PERCEPTION TESTING AND TRAINING APPARATUS

BACKGROUND OF THE INVENTION

In the testing of visual perception, various kinds of charts, lights, and targets are frequently employed, which are arranged and manipulated in a variety of ways to permit some assessment to be made of a person's visual capabilities. Such devices are particularly useful in testing the visual perception of children and for prescribing activities designed to improve such perception.

Thus, the ability to focus one or both eyes on an object may be tested as well as the range and acuteness of vision.

Apparatus and methods of testing audio perception have also been devised by which the acuteness of sound perception can be determined as well as the range of frequencies which an individual is capable of hearing.

Methods of and means for testing the effect of visual perception or sound perception, or for coordinating sound and visual perception are not well known or commonly used.

More especially, no effective means appears to have been devised for coordinating of integrating audio and visual perception to test the effect of one upon the other, or for use in the detection of impairment or improvement of sight and hearing.

SUMMARY OF THE INVENTION

The apparatus of the present invention, briefly described, comprises a visual satellite or tracking member which is preferably of hollow construction provided with sound producing means and having visually observable means thereon for testing visual perception. The apparatus includes means for movably supporting the tracking member for movement through a predetermined path for observation by the user to measure or test the user's visual and audio perception and to permit coordination or integration of sight and sound whereby the effect of visual perception on hearing, and the effect of audio perception on sight may be tested.

The apparatus may be used for the testing of audio or visual perception, or both, and for the performance of visual and audio exercises intended to improve sight and sound perception, or for amusement or the playing of games.

The apparatus also includes sound producing target members and missle means for use therewith for testing or coordinating audio and visual perception and which may be used for audio and visual training or amusement purposes.

DETAILED DESCRIPTION OF PARTICULAR EMBODIMENTS OF THE INVENTION

Figure 1:
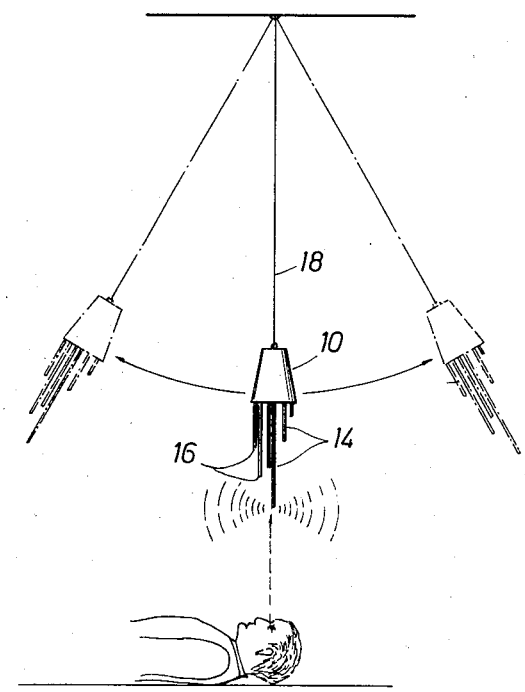
FIG. 1 is a side elevational view, on a reduced scale, illustrating a preferred embodiment of the invention, showing one manner of its use.
Figure 2:
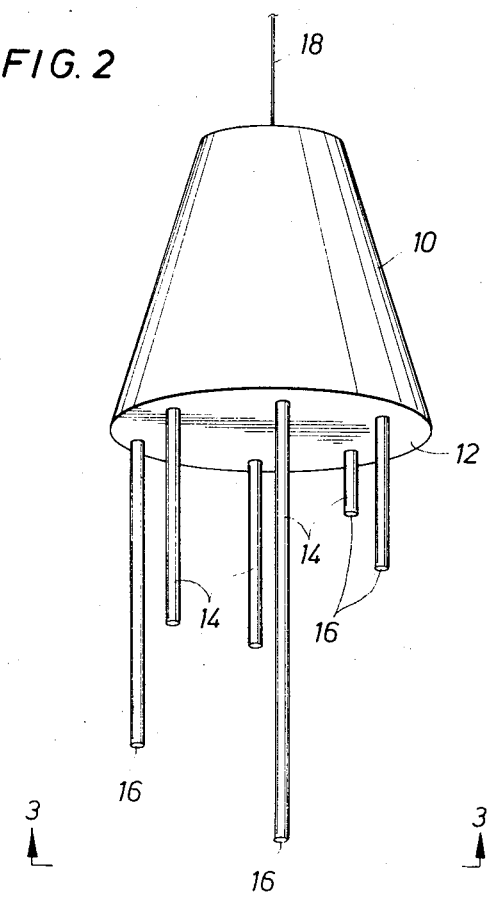
FIG. 2 is a perspective view showing a suspensible audio and visual satellite or tracking member of the invention.
Figure 3:
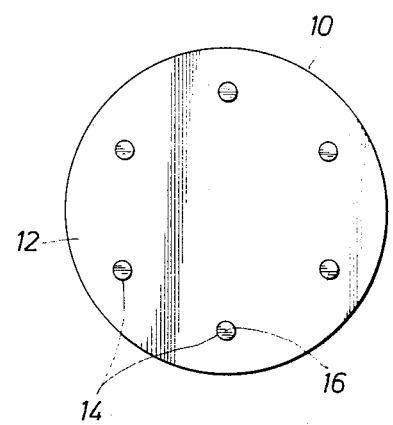
FIG. 3 is a bottom view of the audio and visual tracking member of FIG. 2.

The apparatus of the Invention comprises a visual satellite or tracking member 10, preferably of hollow construction, which may take the form of a hollow ball or the like, or which may be other convenient shape, such as the truncated cone illustrated in FIG. 2, of any desired size, and made of suitable material such as molded plastic.

In the present illustration, the tracking member is of a generally cone shape having a flat lower face 12 at its larger lower end. The member is provided with a number of downwardly extending pegs or rods 14 extending from its lower face, which may be randomly positioned or arranged in a specific pattern, such as the circular arrangement shown, and which are of different predetermined lengths. The rods may be of any desired diameter, and may be of other shapes than round in cross section, and each formed with a free end face 16 upon which a number or other identifying index may be marked. The rods or their free end faces may be differently colored or otherwise designed for visual differentiation.

Suitable audio signal producing means, of any convenient type, not shown, is disposed in the hollow body of the member 10, such as a loud speaker, sound recorder, or the like, by which the device may be equipped to give an audiable signal as well as being visually observed. Such sound producing means may be self contained and actuated in the body, or may be remotely controlled as by radio means for operation remotely whereby the audible signal may be programmed to deliver a prerecorded message, such as instructions to the user, or merely to deliver sounds of predetermined frequency or intensity.

Such sound producing apparatus is of well known type and construction, and need not be described in detail, but may be of any suitable kind.

The member 10 may be suitably supported for operation, as by means of a cord 18 or the like, by which the member may be suspended from the ceiling or other overhead support for swinging movement in any desired path, such as swinging in a circle or reciprocating along an arc in the manner of a pendulum.

In making use of the apparatus, the user may be lying in a prone position or reclining below the suspended member in a position to comfortably observe the free lower ends of the rods 14 at a suitable distance to read or identify the same visually.

By instructing the user to focus his eyes upon selected ones of the free end faces 16 of the rods 14 while moving the member in a predetermined manner, the user's visual perception may be tested.

The user's ability to coordinate audio and visual perception may also be tested by having the user track the satellite member by sight and by hearing or audio perception may be tested by instructing the user to track the satellite by sound with his eyes closed.

Figure 4:
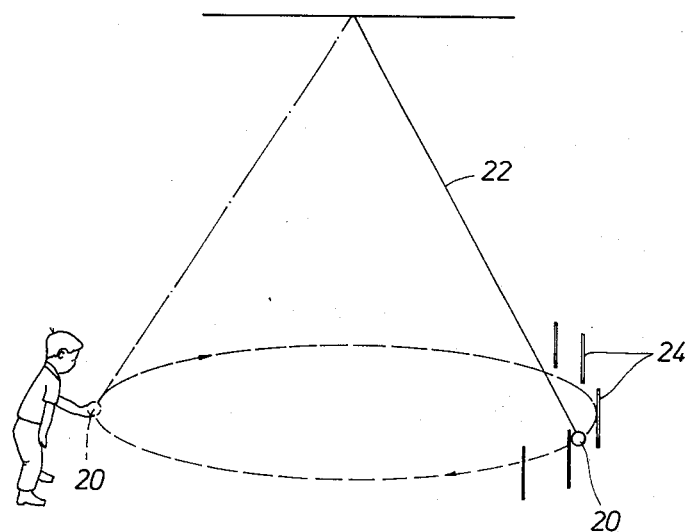
FIG. 4 is a perspective view, on a reduced scale, of a somewhat modified form of the apparatus of the invention, showing a different manner of use of the same.

A somewhat different form of the apparatus of the invention which is also adapted to be used as a game, is illustrated in FIG. 4, wherein a tethered ball 20 is suspended from any suitable overhead support, as by means of a cord 22 or the like for swinging movement.

In this form of the apparatus, one or more target members 24 are provided, which are preferably of hollow structure, equipped for sound emission preferably in the same manner as the satellite or tracking member 10. The target members 24 may be of peg or rod-like shape adapted to be inserted in the ground, or may be of other configuration to be positioned thereon.

In using this form of the apparatus, the target members may be arranged in any desired pattern on the ground or supporting surface, the cord 22 being of a length to prevent the tethered ball 20 from striking the surface, but to allow the same to swing into contact with one of the target members. The ball is then actuated by the user, standing in a position remote from the target members, in an endeavor to strike one of the target members with the ball.

The target members may be adapted to emit sounds of the same or different frequencies to provide a sound source toward which the user tries to direct the ball with or without also observing the target members visually.

By the use of the invention, methods are readily devised for the testing of visual and audio perception and for the improvement of such perception.

The apparatus may be used in various ways to coordinate or integrate sight and sound to improve perception or merely for amusement or game playing.

Target members may be distinguished by the use of colors and the members may, if desired, be provided with lights for better visibility.

Having thus clearly shown and described the invention, which is claimed as new and desired to secure by Letters Patent is:

1. In visual and audio perception apparatus
   a tracking member to be visually observed and audibly tracked,
   audio signal producing means on said member,
   means for movably supporting the member for movement along a predetermined path, and
   visual means on the member comprising spaced apart, external, elongated elements whose outer ends are located at different distances from the member and at different distances from a fixed point of observation spaced from the member.

2. The apparatus as claimed in claim 1 wherein said tracking member is hollow and said audio signal producing means is disposed inside of said member.

3. The apparatus as claimed in claim 1 wherein said visual means comprises
   a plurality of spaced apart rod-like elements of different lengths extending from said member and
   means on said elements for visually distinguishing the elements.

4. The apparatus as claimed in claim 1 wherein said supporting means for supporting the member for movement along a predetermined path includes flexible means supporting the member for horizontal swinging movement.

* * * * *